United States Patent
Bacon et al.

(10) Patent No.: US 7,601,372 B2
(45) Date of Patent: Oct. 13, 2009

(54) CONTINUOUS PICKLE DESALTING PROCESS AND APPARATUS

(75) Inventors: Rod Bacon, Suamico, WI (US); Ted Koelling, Green Bay, WI (US); Adam Spratlin, Oconto Falls, WI (US)

(73) Assignee: Bay Valley Foods, LLC, Green Bay, WI (US)

( * ) Notice: Subject to any disclaimer, the term of this patent is extended or adjusted under 35 U.S.C. 154(b) by 513 days.

(21) Appl. No.: 11/399,057

(22) Filed: Apr. 5, 2006

(65) Prior Publication Data

US 2007/0237858 A1 Oct. 11, 2007

(51) Int. Cl.
*A23B 7/10* (2006.01)

(52) U.S. Cl. .................. 426/49; 426/231; 426/615; 426/506; 426/507; 99/516; 99/534; 99/404; 99/443 C; 99/485; 99/535; 435/283.1

(58) Field of Classification Search ............. 426/49, 426/231, 615, 506, 507; 99/516, 524, 404, 99/443 C, 485
See application file for complete search history.

(56) References Cited

U.S. PATENT DOCUMENTS

| | | | |
|---|---|---|---|
| 1,845,748 A | 2/1932 | Hey | |
| 4,674,401 A * | 6/1987 | Goli | 99/348 |
| 4,844,929 A | 7/1989 | Kingsley | 426/326 |
| 5,775,348 A * | 7/1998 | Rush et al. | 134/72 |
| 6,024,637 A | 2/2000 | Scherch | 452/177 |
| 6,110,513 A | 8/2000 | Hackl et al. | 426/281 |

FOREIGN PATENT DOCUMENTS

| | | |
|---|---|---|
| FR | 2 808 166 A1 | 11/2001 |
| JP | 07-050990 A | 2/1995 |
| JP | 07-303446 A | 11/1995 |
| JP | 2001-346563 A | 12/2001 |
| JP | 2002-010770 A | 1/2002 |

* cited by examiner

*Primary Examiner*—Keith D. Hendricks
*Assistant Examiner*—Hamid R Badr
(74) *Attorney, Agent, or Firm*—Winston & Strawn LLP

(57) ABSTRACT

A continuous method and an apparatus for desalting pickles is provided. The method comprises conveying pickles having a certain salt content along a path; spraying water onto the pickles as they are conveyed along the path, wherein the water is provided in an amount sufficient to saturate the pickles and displace a portion of the salt therein; collecting water that drains from the saturated pickles; and measuring salt content of the collected water to monitor the process and determine when the desalting process is complete.

18 Claims, 1 Drawing Sheet

CONTINUOUS PICKLE DESALTING PROCESS AND APPARATUS

FIELD OF THE INVENTION

The present invention relates to a method of producing a cured or brined pickle product. More particularly, the invention relates to a process for desalting a cured or brined pickle product and an apparatus therefor.

BACKGROUND OF THE INVENTION

The process of brine-curing cucumbers to prepare pickles is long known and widely used. For example, according to a conventional process, cucumbers are brined by being placed in a tank with a salt brine solution, and are fermented into pickles in 14 to 28 days. Cucumbers ferment naturally in brine that has a salt content of around 8%. A higher salt content of about 8 to 16% may be provided for storage, for example to avoid freezing in the winter. Fermented pickles can remain in the brine for months or even years. However, such high brine salt content necessitates a "desalting" step prior to packaging and shipping, to reduce the salt level to about 3 to 4% by weight so that the product remains preserved while being edible.

Previous processes for desalting pickles generally have utilized large heated water tanks, into which pickles are introduced and air is bubbled to agitate and move the pickles. Such conventional process is disadvantageous in requiring a substantial amount of time to complete the desalting process. For example, treatment of whole pickles requires 24 to 48 hours in 110° F. water to achieve desired final parameters. The treatment time is reduced for chips and relish because of their higher surface area, but is still substantial at about 35-40 minutes in a batch process.

Further, while the water in the tank can be drained and replaced to speed up the process, the removed water needs be treated prior to discharge to adjust pH, remove solids and possibly treat for chlorides. A pickle desalting process also necessarily results in chloride discharge, and proper disposal of chloride further increases manufacturing costs of producing pickles.

Because of these disadvantages, there have been attempts to improve or eliminate the desalting process. For example, U.S. Pat. No. 1,845,748 to Hey discloses treating brine cured pickles with a caustic solution of potassium hydrate, caustic soda, or other caustic alkali solution to render the outer skin of the cucumbers more permeable and therefore more receptive to desalting and subsequent introduction of any flavoring liquors. However, the pickles must be thoroughly rinsed after treatment with caustic solution to remove all traces of lye. Thus, while this process may speed up desalting, the process is also more complicated than the conventional desalting using only water, since it requires additional treatment steps with a separate solution.

U.S. Pat. No. 4,844,929 to Kingsley discloses a rapid, fermentation-free pickling process that uses a specific pickling powder composition of acidulants, spices, flavors, salt and certain chloride and calcium salts. This one-step process is described to achieve the desired salt level without requiring a desalting process. However, the process disclosed in this patent is of limited use because only a specific pickling composition can be used.

U.S. Pat. No. 6,110,513 to Hackl et al. discloses a method for curing pickle stock without the conventional fermentation process by immersing the pickle stock in a curing liquid and subjecting it to alternative vacuum and pressure treatment steps. While addressing chloride discharge problems of the conventional pickle production, this patent also does not provide any disclosure for improving the desalting process.

Thus, what is needed is an improved desalting process which reduces the process time and which can be used with any pickling method. Further, a pickle desalting process that can reduce chlorine discharge is desired.

SUMMARY OF THE INVENTION

The present invention relates to a continuous pickle desalting process. The process comprises: conveying fermented pickles having salt content of greater than 6% by weight along a path; spraying water onto the pickles as they are conveyed along the path with the water provided in an amount sufficient to saturate the pickles and displace a portion of the salt therein; collecting water that drains from the saturated pickles; and measuring salt content of the collected water to determine when the desalting is complete.

The pickles can be provided in a bed on the conveyor, and can be in any form, such as in the form of chips. During the process, the bed of pickles can be turned over to expose different chips to the sprayed water. Where the pickles are provided in the form of relish, the process further provides pressing the relish after completion of the desalting to remove excess water.

The pickles can be conveyed on a movable support which includes apertures that are smaller than the size of the pickles so that the sprayed water can drained from the support as the product is conveyed along the path. The water that drains from each support can be collected in a separate reservoir and is tested to determine how the desalting of the pickles is progressing.

According to one embodiment, the water is applied at a weight that is about 25 to 30% of the weight of the pickles. The excess water collected from saturated pickles can be diluted and recycled to reduce the amount of chloride containing water that would otherwise be discharged. Further, a portion of the water can be discharged without further treatment if the chloride content is too high to recycle.

According to one embodiment of the invention, the pickles are conveyed on a plurality of movable supports which are arranged in vertical alignment to conserve plant space, wherein the pickles fall from one conveyor to a subjacent conveyor to expose different pickles to the sprayed water.

The movable supports can move at any desired rate, for example at a rate of about 30 and 40 feet per minute. In one embodiment, pickles having an initial salt content of about 8% are desalted while being sprayed and moving along the path for a time period of between about 3 and 10 minutes to a final salt content of about 2%.

Advantageously, the resulting desalted product exhibits essentially no defects compared to those encountered with conventional processing.

In another aspect, the invention relates to a continuous pickle desalting apparatus for use in conjunction with the present desalting process. The apparatus comprises: at least one moving support, such as a conveyor, for conveying fermented pickles having salt content of greater than 6% by weight along a path; a spraying device, such as a plurality of spray nozzles, for applying water onto the pickles as they are conveyed along the path with the water provided in an amount sufficient to saturate the pickles and displace a portion of the salt therein; collecting pans for receiving water that drains from the saturated pickles; and a testing device for measuring salt content of the collected water to determine when the desalting is complete.

BRIEF DESCRIPTION OF THE DRAWINGS

The features and benefits of the invention will now become more evident from a review of the following detailed description of illustrative embodiments and the accompanying drawing, wherein.

DETAILED DESCRIPTION OF PREFERRED EMBODIMENTS

Figure 1:
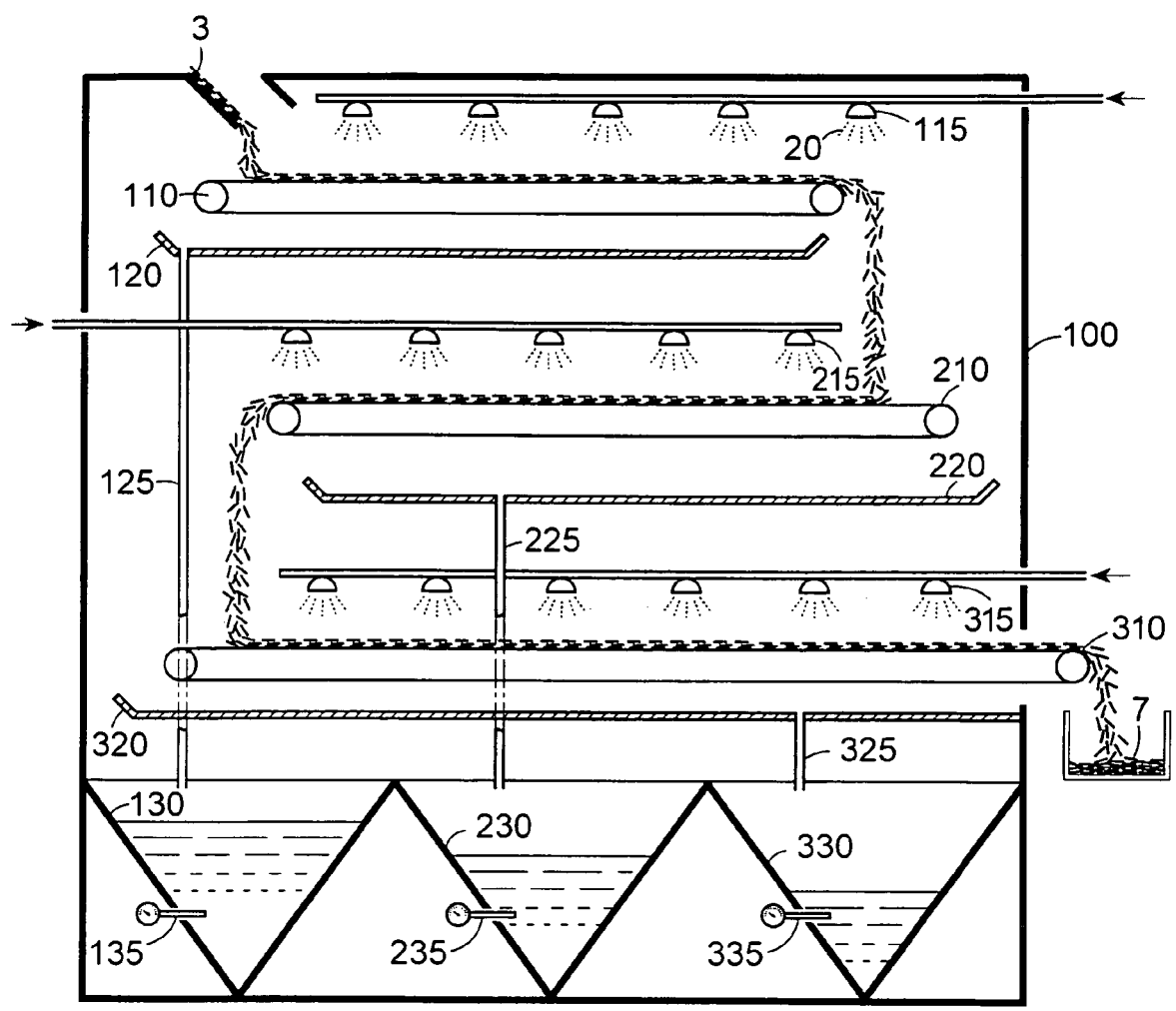
FIG. 1 is a schematic illustration of the present desalting process and apparatus.

The present invention provides a process and apparatus for desalting pickles which significantly reduces process time, is easy to use, and does not require any special composition to effect desalting.

Any type of pickle requiring desalting can be used, e.g., a pickle having a salt content higher than about 3 to 4% found in a regular pickle product. For example, pickles having a salt content of about 6% or greater by weight, e.g., about 8-16% as often found in brine fermented pickles, can be used. Any form of pickle, e.g., spears, chips, and relish, can be used with the present continuous process. As used herein, the term "pickle" refers to any form of pickle, including whole cucumber pickles, sliced pickles in the form of a spear or a chip, and pickles that are diced in the form of relish.

According to the present process, fermented pickles requiring desalting are conveyed along a path while being sprayed with water. Water is sprayed in an amount sufficient to saturate the pickles and displaces a portion of the salt therein to effect desalting. As the pickles are saturated with sprayed water, excess water is drained from the pickles and is collected. As the pickles move along the path, salt content of the pickles and/or the drained water is measure to monitor the process. The desalting process is complete when the measured salt content indicates that the desired salt level is reached in the pickle product.

In another aspect, the invention relates to an apparatus for desalting pickles. The present apparatus provides continuous desalting of the pickles and comprises at least one moving support for conveying pickles, such as a conveyor belt; a spraying device, such as a spray nozzle, for applying water onto the pickles; a collecting pan for receiving water that drains from the saturated pickles; and a testing device for measuring the salt content of the collected water or of the pickles to monitor the desalting process and to determine when the desalting is complete.

The present desalting process and apparatus will now be explained with reference to FIG. 1. Fermented pickles 3 are conveyed along a path, such as a conveyor belt 110, which can be provided in a tank 100. The pickles 3 are introduced onto the conveyor 110 to form a bed thereon. When pickle slices are utilized, for example, a typical bed size is about 2 inches. In thickness An agitator or a vibrator (not shown) can be provided to spread the pickles uniformly on the conveyor. The conveyor 110 has an outlet for draining water. For example, an apertured or a mesh conveyor can be used, as long as the apertures are smaller than the size of the pickles. The size of the aperture can be adjusted depending on the type and size of the product, with a smaller aperture or finer mesh used to process relish or sliced pickle products.

As the pickles are conveyed along the path, water is sprayed onto the pickles. For example, water 20 is dispensed from spray nozzles 115 provided above the conveyor 110. Ambient temperature water may be used, but it is preferable to use warm water (100 to 120 F.) since this accelerates the desalting process. The amount of water sprayed onto the pickles can be adjusted as desired, but should be sufficient to saturate the pickles and displace a portion of the salt contained in the pickles, thereby achieving desalting of the pickles. The preferable amount of the water to be sprayed depends on other parameters of the process, including the amount or weight of the pickles on the conveyor, the speed of the conveyor, and the length of time water is sprayed onto the pickles. In a preferred example, water is sprayed in an amount of about 25 to 30% by weight of the pickles on the conveyor. With such amount of water, a 2-inch bed of pickle chips having a salt content of about 8% is desalted to a salt content of about 3 to 4% in about 4 to 7 minutes when moved along the conveyor at a rate of about 30 to 40 feet per minute (ft/min). This process is also found to significantly reduce the amount of water required for desalting, by about 40 to 50% compared to the conventional process utilizing a large heated water tank. Advantageously, the process also results in about 25% less chloride discharge, which facilitates removal or discharge of fluids from the plant.

As the pickles are sprayed, excess water is drained from saturated pickles through the apertures in the conveyor 110. The drained water is collected in a collecting pan 120 placed beneath the conveyor 110, and is analyzed for salt content, for example with a conductivity probe, which converts a measured value to a salt concentration. Alternatively, the salt content of the pickles, rather than that of the drained water, can be measured. The process is continued until a desired salt content is achieved, e.g., at around 2% for measurement obtained from the collected water, or around 3 to 4% for measurement obtained directly from the pickles. If a lower sodium pickle is desired, the desalting process is continued until a lower salt content is obtained. Thus, the present process can be used to rapidly produce a pickle product having any desired salt content.

In one embodiment, the pan is connected to a reservoir 130, such as a vessel, via a valve 125. Because the amount of chloride discharge is lower by about 25% with the present process than the conventional process, the water collected in the reservoir 130 can be diluted and recycled if desired. A portion of the water, e.g., about ⅓ of the collected water, can be discharged without further treatment if the chloride content becomes too high to recycle, and the remaining portion can be diluted and recycled. Thus, the present process is further beneficial in reducing chloride discharge, and can reduce or eliminate the costly chloride treatment processes. Where a reservoir is provided, a testing device such as a conductivity probe 135 can be associated with the reservoir 130 for determining the salt content of the water collected in each reservoir.

If desired, a plurality of conveyors can be provided with a plurality of collecting pans to facilitate analysis of the water drained along the desalting process. For example, a plurality of pans can be provided under one long conveyor, or a plurality of conveyors can be provided with a separate pan under each conveyor. Use of multiple pans facilitates monitoring the salt content of the pickles along the process.

According to one embodiment of the invention, a plurality of conveyors are arranged in vertical alignment to conserve plant space. In such arrangement, pickles fall from one conveyor to a subjacent conveyor as they move along the process line. Such vertical arrangement not only saves space, but is also advantageous in enabling exposure of different pickles to sprayed water, for example by turning over the pickles. Pickles can be turned over as they fall from one conveyor to a subjacent one, thus ensuring even exposure to sprayed water.

According to a preferred embodiment, three conveyors 110, 210, 310 are vertically arranged as shown in FIG. 1, and the pickles are turned over as they fall from conveyor 110 to conveyor 210 and from conveyor 210 to conveyor 310. Each conveyor is provided with a set of spray nozzles 115, 215, 315 and a collecting pan 120, 220, 320 for collecting excess water. Each pan 120, 220, 320 can be connected to a reservoir 130, 230, 330 through a valve 125, 225, 325, respectively.

For convenience, the entire desalting process line may be contained within a tank 100. A tank of any suitable size and design can be used. For example a tank of about 34'×10'×4.5 to 6' can be used. Tolerances are ±0.5 ft. By containing the entire process system in one tank, the present method ensures clean and sanitary processing of the pickles while maintaining efficient use of the plant space. Of course for those plants that are not limited by space, a continuous straight run of conveyor, or a "down and back" arrangement of two conveyers, one above the other at least at their ends, may be used if desired with similar or identical results to the three vertically arranged conveyors.

Upon completion of the desalting process, the desalted pickles 7 can be further processed as desired, e.g., to impart additional flavors, and packaged. When the pickles are provided in the form of relish, the present process further provides removal of an amount of excess water from the desalted product by pressing the product with a pressing device. Pressing can be performed inside the tank 100, at the end of the process, or outside the tank 100. Relish can also pressed as they are moved along the conveyor, and then pressed for a final time at the end of the desalting process.

Accordingly, the present process and apparatus significantly reduce the time required for desalting pickles. Preferably, desired desalting is achieved in about 3 to 10 minutes. More preferably, desalting is completed in about 4 to 7 minutes. The process is also advantageous in reducing, or substantially eliminating defects in final products. Compared to the 4 to 8% defect rate of conventional desalting, the present desalting method results in essentially no defects. Furthermore, the present process results in less chloride discharge than a conventional process, and therefore reduces or eliminates the need for costly chloride treatment.

While the present method and apparatus have been described mostly with reference to certain salt content for purpose of illustration, it will be appreciated that the present desalting process and apparatus can be used with any product having a salt content that is higher than desired in a final product. Likewise, although the present process and apparatus have been described mostly with respect to cucumber pickles, it will be appreciated that any other product requiring desalting can be used, such as cured or fermented peppers or other vegetables.

EXAMPLES

The following example is illustrative only and should not be interpreted as limiting.

Example 1

Desalting of Pickle Chips

Brine fermented pickles having a salt content of about 8% were sliced in the form of chips and desalted with the present method. Three vertically arranged conveyors having a length of about 30' and a width of 3' were provided in a tank of about 34'×10'×5' in size for conveying the pickles along the process. The ends of the conveyors were staggered as illustrated in the drawings so that the pickles could drop from the uppermost conveyor to a subjacent conveyor. Each conveyor was provided with a set of spray nozzles for spraying water onto the pickles and a pan underneath the conveyor for collecting excess water draining from the pickles. The pan was connected to a vessel via a valve such that the water collected in the pan is transferred to the vessel. Each vessel was provided with a conductivity probe for measuring the salt content of the water contained in the vessel.

The pickles were introduced on the uppermost conveyor in a bed of about 2 inches. Water was sprayed onto the pickles in an amount of about 25 to 30% of the weight of the pickles on the conveyor, while the conveyor moved at a rate of about 10 to 20 ft/min. The pickles are turned over as they are transferred from the uppermost conveyor to the subjacent conveyor, and the spraying process is repeated.

When the pickles are moved along all three conveyors, the salt content of the water collected from the bottommost conveyor was about 2%, indicating a salt content of about 3 to 4% in the pickles. The entire process was completed in about 4 to 7 minutes, significantly less than 35 to 40 minutes required in the conventional process. The total amount of water sprayed was found to be about 40 to 50% less than the amount used in a conventional process. The amount of chloride discharge throughout the process was also found to be about 25% less than conventional processing. No defective pickle product was found upon completion of the desalting process, in contrast to the 4 to 8% defect rate associated with the conventional process.

As an alternative, conveyors having a length of about 30' and a width of 4' can be provided in a tank of about 34'×10'×6'. Of course, the final size of the apparatus and conveyors will depend upon the quantities of pickles to be processed as well as to the amount of space in the plant to accommodate such equipment. The skilled artisan can select the appropriate size device for any particular pickle processing quantities and overall plant configuration. While a straight conveyor run may be acceptable under some situations, the stacked arrangement is preferred to conserve plant space and water/brine processing equipment.

What is claimed is:

1. A continuous pickle desalting process which comprises:
   conveying fermented pickles having salt content of greater than 6% by weight along a path;
   spraying water onto the pickles as they are conveyed along the path with the water provided in an amount sufficient to saturate the pickles and displace a portion of the salt therein;
   collecting water that drains from the saturated pickles; and
   measuring salt content of the collected water to determine when the desalting is complete.

2. The process of claim 1, wherein the pickles are in the form of chips and are conveyed in a bed and which further comprises turning over the bed to expose different chips to the sprayed water.

3. The process of claim 1, wherein the pickles are in the form of relish and which further comprises pressing the relish after completion of the desalting to remove excess water.

4. The process of claim 1, wherein the water is applied at a weight that is about 25 to 30% of the weight of the pickles.

5. The process of claim 1, which further comprises diluting and recycling the collected water to reduce the amount of chloride containing water that would otherwise be discharged.

6. The process of claim 1, wherein the pickles are conveyed on a movable support that includes apertures that are smaller than the size of the pickles so that the sprayed water can drained from the support as the product is conveyed along the path.

7. The process of claim 6, wherein the pickles are conveyed on a plurality of movable supports which are arranged in vertical alignment to conserve plant space, wherein the pickles fall from one conveyor to a subjacent conveyor to expose different pickles to the sprayed water.

8. The process of claim 7, wherein the water that drains from each support is collected in a separate reservoir and is tested to determine how the desalting of the pickles is progressing.

9. The process of claim 8, wherein the movable supports are moving at a rate of between about 10 and 20 feet per minute and the resulting desalted product exhibits essentially no defects compared to those encountered with conventional processing.

10. The process of claim 7, wherein the pickles have an initial salt content of about 8% and are desalted while being sprayed and moving along the path for a time period of between about 3 and 10 minutes to a final salt content of about 2%.

11. A continuous pickle desalting apparatus which comprises:
- at least one moving support for conveying fermented pickles having salt content of greater than 6% by weight along a path;
- a spraying device for applying water onto the pickles as they are conveyed along the path with the water provided in an amount sufficient to saturate the pickles and displace a portion of the salt therein;
- collecting pans for receiving water that drains from the saturated pickles; and
- a testing device for measuring salt content of the collected water to determine when the desalting is complete.

12. The apparatus of claim 11, wherein the moving support is a conveyor and the spraying device comprises a plurality of spray nozzles arranged above the conveyor and configured to deliver water at a weight that is about 25 to 30% of the weight of the pickles.

13. The apparatus of claim 11, which further comprises a reservoir for receiving water from the collecting pans, with the testing device operatively associated with the reservoir to obtain a sample of liquid therefrom to analyze for salt content.

14. The apparatus of claim 11, wherein the movable support includes apertures that are smaller than the size of the pickles so that the sprayed water can drained from the support as the product is conveyed along the path.

15. The apparatus of claim 11, wherein the pickles are conveyed on a plurality of movable supports which are arranged in vertical alignment to conserve plant space, wherein the pickles fall from one conveyor to a subjacent conveyor to expose different pickles to the sprayed water.

16. The apparatus of claim 15, wherein the water that drains from each support is collected in a separate reservoir and is tested to determine how the desalting of the pickles is progressing.

17. The apparatus of claim 11, wherein the pickles have an initial salt content of about 8% and are desalted while being sprayed and moving along the path for a time period of between about 3 and 10 minutes to a final salt content of about 2%.

18. The apparatus of claim 17, wherein movable supports are moving at a rate of between about 10 and 20 feet per minute and the resulting desalted product exhibits essentially no defects compared to those encountered with conventional processing.

* * * * *